July 29, 1958      J. A. BENNETT ET AL      2,844,958
TORSION FATIGUE TESTING MACHINE FOR WIRE
Filed Nov. 9, 1956      2 Sheets-Sheet 1
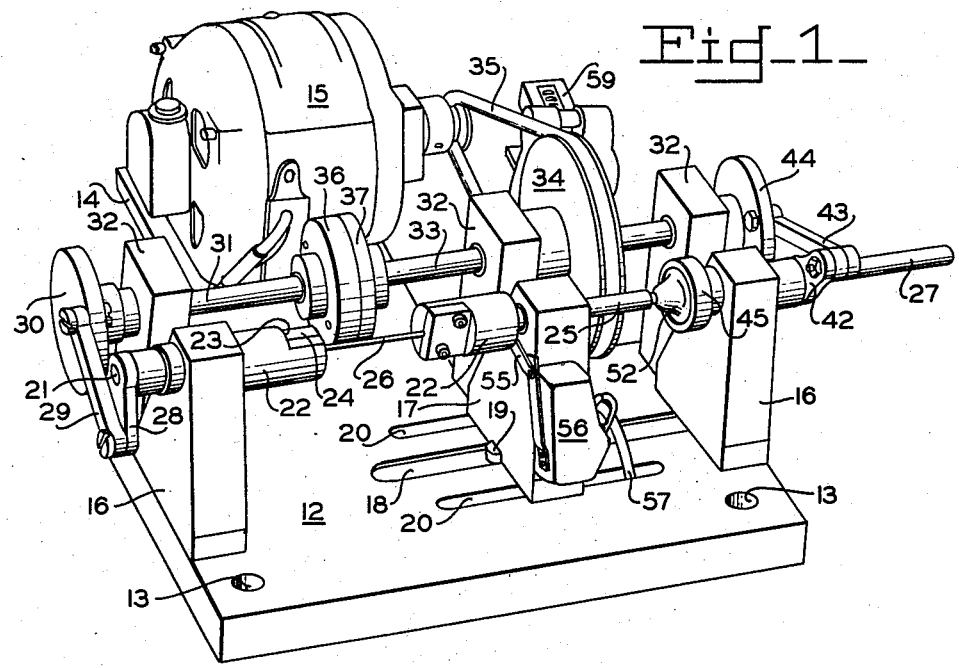
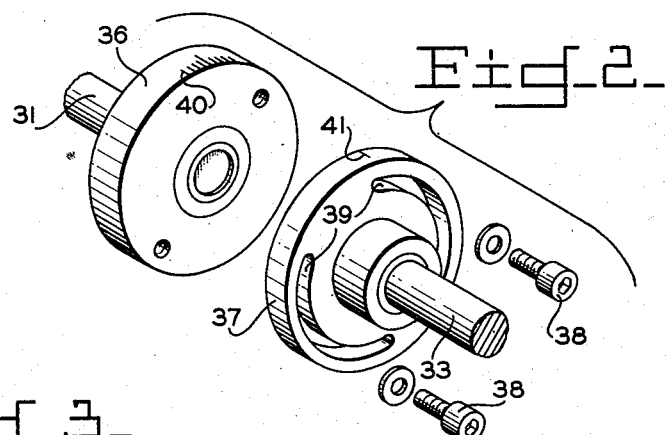
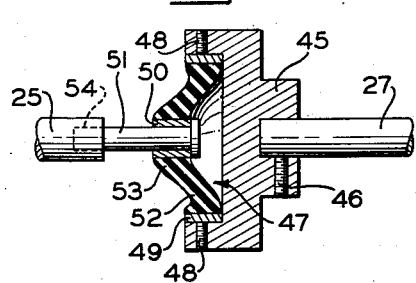
INVENTOR.
John A. Bennett
Harry C. Burnell
BY
W. E. Thibodeau & A. W. Lew
Attorneys.

July 29, 1958  J. A. BENNETT ET AL  2,844,958
TORSION FATIGUE TESTING MACHINE FOR WIRE
Filed Nov. 9, 1956  2 Sheets-Sheet 2
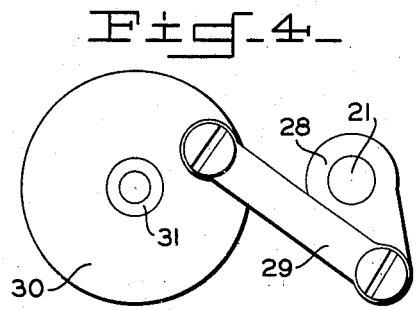
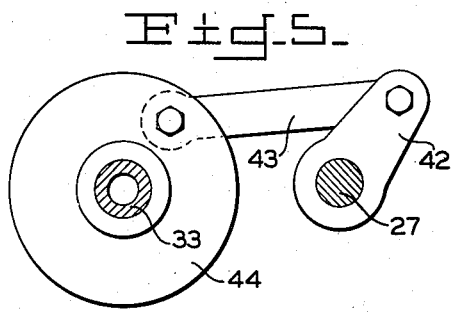
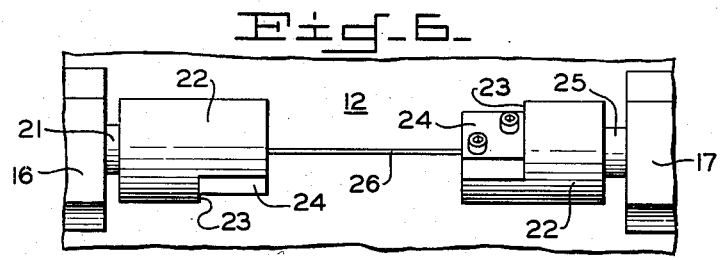
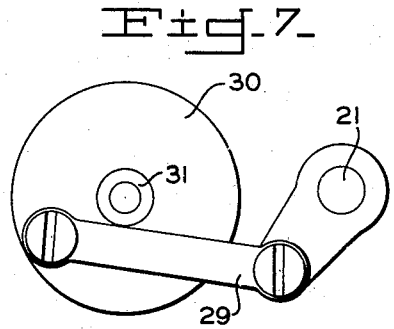
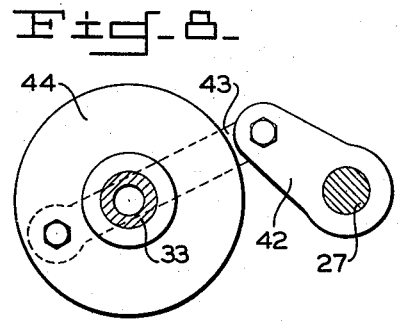
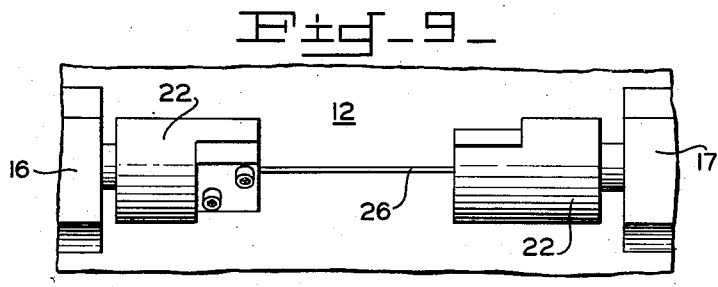
INVENTOR.
John A. Bennett
Harry C. Burnett
BY
W. E. Thibodeau & A. W. Dew
Attorneys.

United States Patent Office 2,844,958
Patented July 29, 1958

2,844,958

TORSION FATIGUE TESTING MACHINE FOR WIRE

John A. Bennett and Harry C. Burnett, Bethesda, Md., assignors to the United States of America as represented by the Secretary of the Army Application November 9, 1956, Serial No. 621,481

7 Claims. (Cl. 73—91)

(Granted under Title 35, U. S. Code (1952), sec. 266)

The invention described herein may be manufactured and used by or for the Government for governmental purposes without the payment of any royalty thereon.

This invention relates to the testing of spring wire and is more particularly directed to means for determining the fatigue life thereof when subjected to the type of torsional stresses usually encountered in the operation of coil springs.

Present methods of determining the physical properties of spring wire prior to being coiled into compression or expansion type springs do not provide accurate information concerning the torsional stresses to which the spring can be subjected without failure. Such unreliability is thought to be due to the fact that the current expedient of fixedly holding one end of a relatively short length of spring wire while twisting the opposite end thereof until failure occurs merely indicates the extent to which the spring wire can be twisted before failure will occur. Obviously, such information cannot serve as a criterion for determining the ability of the spring to withstand repeated alternate torsional stress.

Accordingly, it is an object of this invention to provide improved means for determining the fatigue life of spring wire prior to the coiling thereof into spring form.

A further object of the present invention lies in the provision of apparatus for determining the ability of spring wire to withstand repeated applications of torsional stress in successive alternate directions.

Still another object of the present invention is to provide a simple machine for twisting a relatively short length of spring wire in alternate directions with a constant amplitude of deflection.

A more specific object of this invention is to provide improved apparatus for eliminating the introduction of bending stresses during the application of repeated reversals of constant amplitudes of torsional deflection to a test sample of wire of the type from which coil springs are formed.

The specific nature of the invention as well as other objects and advantages thereof will clearly appear from a description of a preferred embodiment as shown in the accompanying drawings in which:

Fig. 1 is a perspective view of the entire testing machine;

Fig. 2 is an exploded perspective view of the coupling mechanism which controls the phase relationship of the wheel and crank mechanisms;

Fig. 3 is a view in longitudinal section of the tension-producing assembly which permits the machine to be halted immediately upon failure of the spring wire being tested;

Fig. 4 is an end view of one of the pair of wheel and crank mechanisms;

Fig. 5 is a plan view of the other wheel and crank mechanism taken through the crank mechanism shaft therebetween to show the position thereof relative to that of the mechanism of Fig. 4;

Fig. 6 is a fragmentary view showing the relative positions of the chucks which hold the ends of the spring wire under test when the wheel and crank mechanisms are in the positions shown in Figs. 4 and 5;

Fig. 7 is a view similar to that of Fig. 4 but showing the wheel and crank mechanism during oscillation in the opposite direction;

Fig. 8 is a view similar to that of Fig. 5 but showing the wheel and crank mechanism during oscillation in the opposite direction; and Fig. 9 is a view similar to that of Fig. 6 but showing the positions of the chucks in relation to the positions of the crank and wheel mechanisms shown in Figs. 7 and 8.

As shown in Fig. 1, the testing apparatus is mounted upon a base 12 having corner mounting holes 13 to permit the ready attachment to a table or other suitable means of support. One side of base 12 is provided with a laterally extending portion 14 designed for the mounting of a conventional electric motor 15 thereon. A vertically extending pillow block 16, of greater width at the bottom than at the top thereof, is fixedly secured in any suitable manner to either end of base 12 while a third and similar pillow block 17 is slidably mounted therebetween for longitudinal adjustment along an axis common to all the blocks.

The slidable pillow block 17 is arranged to be releasably locked at any given point along the movable path thereof and to that end base 12 is provided with a rectangular channel 18 in the upper surface thereof which originates centrally beneath one of the fixed pillow blocks 16 and extends longitudinally toward the opposite block to terminate at a point beyond the center of base 12. Adjustable block 17 is seated on a carrier member 19 slidably mounted in channel 18. Base 12 is also provided with a longitudinal slot 20 flanking either side of channel 18 and parallel thereto. A pair of threaded studs (not shown) project from the underside of adjustable pillow block 17 to pass through each of slots 20 so that when suitable locking nuts (not shown) are threaded onto the projecting ends of the studs, block 17 is fixedly locked to base 16.

A shaft 21 is rotatably mounted in the upper portion of the particular fixed pillow block 16 disposed beyond longitudinal channel 18. Fixedly secured to the inner end of shaft 21 is a substantially cylindrical chuck 22 terminating in a right angle cutaway portion 23 against which a flat clamping plate 24 is fixedly bolted. A second identical chuck 22 is similarly secured to the inner end of a second shaft 25 of greater length than shaft 21 and rotatably mounted in adjustable pillow block 17 in axial alignment with shaft 21. Chucks 22 are thereby spaced apart in axial alignment and serve to hold the ends of a sample of spring wire 26 undergoing testing. A third shaft 27 is rotatably mounted in the fixed pillow block 16 which is secured to base 12 adjacent the end of channel 18 in axial alignment with shafts 21 and 25 but preferably of greater length than either thereof. A crank arm 28 is fixedly secured to the outer end of shaft 21 and the free end of arm 28 is in turn pivotally secured to one end of a crank lever 29. The opposite end of lever 29 is pivotally attached to the outer face of a wheel 30 at a point adjacent the rim thereof. Wheel 30 is secured to the outer end of a shaft 31 rotatably carried in a vertical support member 32 suitably fixed to the upper surface of base 12 between fixed pillow block 16 and motor 15. Base 12 is also provided with similar support members 32 each transversely adjacent pillow blocks 16 and 17 and extending along a common longitudinal axis. The latter two support members 32 are arranged to rotatably mount a relatively long shaft 33 carrying a pulley wheel 34 connected to motor 15 by suitable belting 35.

The adjacent ends of shafts 31 and 33 terminate in mating flanges 36 and 37, respectively, secured to each other by suitable horizontal bolts 38. Flange 37 is provided with a pair of opposed arcuate slots 39 as best shown in Fig. 2 through which bolts 38 are arranged to extend. Thus, when bolts 38 are loosened, shafts 31 and 33 may be rotated relative to each other for a purpose to be later shown. The outer rim of flange 36 is provided with suitable graduations 40 for indicating the degree of rotation of a given zero point 41 located on flange 37.

A crank arm 42 of the same construction as crank arm 28 is releasably secured to shaft 27 at a point adjacent the outer face of fixed pillow block 16. Crank arm 42 is pivotally tied to a crank lever 43 which is in turn pivotally fastened to a wheel 44 in the same manner as lever 29 and wheel 30. However, crank arm 42 is disposed so that the connection thereof to crank lever 43 is above the axis of rotation of wheel 44 in comparison to the connection between crank arm 28 and crank lever 29 which is below such axis.

As best shown in Fig. 3 a cup-shaped collar 45 is fixedly secured to the other end of shaft 27 by any suitable means such as set screw 46 and a flexible coupling 47 is fixedly seated therein by means of set screws 48. Coupling 47 consists of an outer metallic ring 49 of substantially the same diameter as the interior of collar 45, an inner metallic ring 50 to which is fixedly secured, as by brazing or the like, the head portion of a bolt 51, and a diaphragm 52 of a flexible material, such as rubber, fixedly disposed between rings 49 and 50. Diaphragm 52 is formed with a central hub portion 53 which is fixedly secured by any suitable means to the exterior surface of inner ring 50. The free end of bolt 51 is fixedly secured in the end of shaft 25 as shown at 54 and, therefore, inasmuch as the headed end of bolt 51 bears upon the inner face of ring 49, any movement of shaft 25 away from collar 45 will stretch flexible coupling 47 accordingly.

The clamping distance between chucks 22 is deliberately arranged so that shaft 25 is longitudinally displaced in relation to the end of shaft 27 whereby the consequent stretching of flexible coupling 47 imparts a degree of tension to shaft 25. Thus, when wire 26 becomes fractured, chuck 22 on shaft 25 is automatically pulled back toward the face of adjustable pillow block 17 by the return of the flexible body of coupling 47 to the normal position thereof. Such movement serves to actuate a resilient contact 55 fixedly secured to a switch box 56 which is in turn affixed to the side of block 17. Actuation of contact 55 halts further operation of motor 15 which is connected in series to switch box 56 by wiring 57. The rotation of motor 15 is transmitted through a suitable reducing gear assembly (not shown) to a counter mechanism 59 which records each revolution of pulley wheel 34. Accordingly, when the operation of motor 15 is halted by the actuation of contact 55, further counting of the cycles of torsional stress imparted to the test sample of spring wire 26 is likewise halted.

In the operation of the testing machine, the rotation of shaft 33 is imparted to shaft 31 through the coupling of flanges 36 and 37. Accordingly, wheels 30 and 44 are rotated in the same direction to impart a circular movement to the ends of crank levers 29 and 43. However, inasmuch as the path of movement of the opposite ends of levers 29 and 43 is restricted to the arcuate paths along which the connected ends of crank arms 28 and 42 can be pivoted about shafts 21 and 27, respectively, the rotation of shafts 31 and 33 is converted to a limited reciprocal rotation of shafts 21 and 27 and, consequently, to shaft 25 as well. This reciprocal movement is, of course, directly imparted to chucks 22 and, consequently, to the test sample of the spring wire 26 gripped thereby. It will be noted from Figs. 4 and 5 that crank arm 28 is arranged to oscillate below the longitudinal axis of shaft 21 whereas crank arm 42 is arranged to oscillate above the longitudinal axis of shaft 27. As a result of such arrangement, chucks 22 are simultaneously oscillated in the opposite direction from one another and, consequently, impart torsional stress to spring wire 26.

The arc through which crank arms 28 and 42 are oscillated depends upon the relative dimensions of the components of the wheel and crank mechanisms and is preferably arranged to provide about 120° of movement in either direction. However, in order to impart torsional stress to spring wire 26 during the entire path of oscillation of chucks 22, each chuck must begin and end the movement thereof in one direction at substantially the same instant as the other chuck begins and ends its movement in the opposite direction. Such timing can be effected only if the ends of crank levers 29 and 43 are pivotally attached to wheels 30 and 44 at the same respective locations. Thus, in the event it is desired to apply torsional stress to a test sample of spring wire during rotation of less than 120°, this can be accomplished merely by loosening the engagement between flanges 36 and 37 and turning one in relation to the other by the desired amount as indicated by graduations 40 and zero point 41 and then tightening bolts 38. While such adjustment does not decrease the arcuate path of the movable end of each crank arm 28 and 42, it does shorten the interval during which the crank arms move in opposite directions and, consequently, reduces the torsional load being applied to the test sample of spring wire 26 during each cycle of chuck oscillation. This adjustment permits the testing machine to provide the same relative ratio between the diameter of the wire being tested and the torsional load being applied thereto regardless of the diameter of the wire.

The machine of this invention thereby provides means for testing the ability of spring wire 26 to resist pure torsional stress being applied in alternate cycles of constant deflection. Inasmuch as the ends of wire 26 are being twisted in opposite directions about the same axis, the resulting torsional stress thereon is completely free of bending stresses. Consequently, the number of rotations of chucks 22 up to eventual failure of the wire provides a relatively accurate measurement of the endurance life of an expansion or compression type of coil spring fabricated from the wire being tested.

Although a particular embodiment of the invention has been described in detail herein, it is evident that many variations may be devised within the spirit and scope thereof and the following claims are intended to include such variations.

We claim:

1. In apparatus for determining the torsional fatigue life of the type of wire employed in the formation of coil springs, a pair of spaced apart chucks for securely holding the ends of a test length of the wire therebetween, a crank arm fixedly associated with each of said chucks, a wheel mounted on either end of a shaft disposed for uniform rotation about an axis parallel to the test length of wire, crank lever means pivotally connected between each of said wheels and each of said crank arms for converting the rotary motion of the former to uniform oscillatory movement of the latter whereby said chucks are rotated accordingly, means for circumferentially positioning the points of connection between each crank lever and wheel to change the phase relationship of said chucks and effect a corresponding increase or decrease in the magnitude of the torsional stress imparted to the wire by the rotation of said chucks in opposite directions, and means for totaling the cyclic rotations of said chucks.

2. A machine for subjecting a test length of spring wire to the type of torsional stress encountered by coil springs during the compression and expansion thereof comprising a pair of spaced apart rotatable shafts disposed in longitudinal axial alignment, a chuck fixedly secured to the oppositely facing ends of said shafts for holding the test length of spring wire therebetween, a crank arm fixedly secured to the other end of each of said shafts, said crank arms being disposed so that the projecting portion of one extends below the longitudinal axis of the wire and the projecting portion of the other extends thereabove, a crank lever pivotally connected to the projecting portion of each of said crank arms, wheel means for imparting constant rotary motion to one end of each of said crank levers and thereby actuating the other end thereof to impart oscillatory motion to said crank arm pivoted thereto whereby said chuck secured to the opposite end of said shaft is rotated accordingly, means for adjusting the relative radial positions of the projecting portions of said crank arms to control the phase relationship of said chucks, means for correlating the relative radial positions of the projecting portions of said crank arms with the degree of rotation of said chucks in either direction, means for repeating the rotation of said chucks in either direction until fracture of the wire, and means for stopping the rotation of said wheel means in response to the fracture of the wire.

3. In apparatus for determining the torsional fatigue life of the type of wire employed in the formation of coil springs, a base having a fixed pillow block at either end thereof, shaft means rotatably mounted in each of said pillow blocks in longitudinal axial alignment, a chuck fixedly secured to the oppositely facing ends of said shaft means between said pillow blocks, a crank arm fixedly secured to each of the other ends of said shaft means exteriorly of said pillow blocks, each of said crank arms respectively projecting below and above the test length of the wire, a support member fixedly secured to said base transversely adjacent each pillow block, an axle rotatably mounted in said supports along an axis parallel to the test length of wire, a wheel fixedly secured to each end of said axle in transverse axial alignment with said crank arm, a crank lever pivotally connected at one end to each of said wheels at a point adjacent the outer edge thereof and pivotally connected at its other end to the terminus of the projecting portion of said crank arm, means for imparting constant rotation to said axle to actuate said crank lever and transmit uniform oscillatory motion to said crank arm whereby said chucks are rotated accordingly, means for adjusting the relative radial positions of said projecting portions of said crank arms to change the phase relationship of said chucks in order to impart a given amplitude of deflection to the wire, means for repeating the rotation of said chucks in either direction until fracture of the wire, and means for progressively totaling the number of reversals of rotation of said chucks.

4. Apparaus for determining the torsional fatigue life of the type of wire employed in the formation of coil springs, a base having a fixed pillow block at either end thereof, a longitudinally adjustable pillow block slidably mounted to said base between said fixed blocks and in axial alignment therewith, a shaft rotatably mounted in each of said pillow blocks, a chuck fixedly secured to the oppositely facing ends of said shafts between one of said fixed pillow blocks and the adjustable pillow block, clamp means associated with said chucks for fixedly holding the ends of a test length of the wire therebetween, means for adjusting said movable pillow block to accommodate different lengths of wire, a crank arm fixedly secured to the ends of said shafts projecting outwardly beyond said fixed pillow blocks, said crank arms being disposed so that the projecting portion of one extends downwardly toward said base and the projecting portion of the other extends upwardly away from said base, means for transmitting the rotation of said shaft in said fixed pillow block to said shaft in said adjustable pillow block, a support member fixedly secured to said base transversely adjacent each of said pillow blocks, an axle rotatably mounted in said supports along an axis parallel to the test length of wire, a wheel fixedly secured to each end of said axle in transverse axial alignment with said crank lever, a crank lever pivotally connected at one end to each of said wheels at a point adjacent the outer edge thereof and pivotally connected at its other end to the terminus of the projecting portion of said crank arm, means for imparting constant rotation to said axle whereby said crank levers oscillate said crank arms and thereby rotate said chucks accordingly, said axle including adjustable coupling means for changing the circumferential position of each wheel and crank lever connection relative to the circumferential position of the other, means for correlating the relative positions of said crank levers with the phase relationship of said chucks to determine the amplitude of deflection imparted to the wire therebetween, means for continuously repeating the rotation of said chucks in either direction until fracture of the wire, means for progressively totaling the reversals of rotation of said chucks, and means for automatically stopping further rotation of said axle in response to the fracture of the wire.

5. The combination defined in claim 4 wherein said means for adjusting said movable pillow block to accommodate different lengths of wire comprises a longitudinal channel in the upper surface of said base flanked by a longitudinal slot in either side thereof extending completely through said base, a carrier slidably disposed in said channel for seating said adjustable pillow block thereon, and means for locking said pillow block at any point longitudinally along said slots.

6. The combination defined in claim 4 wherein said axle comprises two independent sections and said adjustable coupling means includes a flange fixedly secured to the adjacent ends of said axle sections, one of said flanges having a pair of opposed arcuate slots, means for indicating the extent to which one of said flanges is adjustably rotated relative to the other within the arcuate limit of said slots, and means for releasably locking said flanges subsequent to the rotational adjustment thereof.

7. The combination defined in claim 4 wherein said means for transmitting the rotation of said shaft in said fixed pillow block to said shaft in said adjustable pillow block comprises a collar fixedly secured to the end of said shaft in said fixed pillow block, a flexible coupling secured within said collar and having a hollow hub portion, a headed bolt having the head portion thereof fixedly secured within said hub portion of said flexible coupling and having the other end thereof threadably engageable with said shaft in said adjustable pillow whereby the positioning of said chucks for clamping engagement with the end of the wire stretches said coupling accordingly and thereby biases said shaft in said adjustable pillow toward said collar upon fracture of the wire, and switch means on said adjustable pillow block responsive to the change in position of said longitudinally movable chuck for stopping the rotation imparted to said axle.

References Cited in the file of this patent

UNITED STATES PATENTS

| | | |
|---|---|---|
| 1,660,270 | McAdam | Feb. 21, 1928 |
| 2,170,640 | Kenyon | Aug. 22, 1939 |

FOREIGN PATENTS

| | | |
|---|---|---|
| 758,021 | France | Oct. 23, 1933 |